(12) United States Patent
De Graw et al.

(10) Patent No.: US 10,800,610 B1
(45) Date of Patent: Oct. 13, 2020

(54) POSITION-ADJUSTABLE MATERIAL CONVEYER CLEAT

(71) Applicants: Darren L De Graw, Farmington, UT (US); Robin D Porter, Mountain Green, UT (US); Chad Tyler Porter, Mountain Green, UT (US)

(72) Inventors: Darren L De Graw, Farmington, UT (US); Robin D Porter, Mountain Green, UT (US); Chad Tyler Porter, Mountain Green, UT (US)

( * ) Notice: Subject to any disclaimer, the term of this patent is extended or adjusted under 35 U.S.C. 154(b) by 0 days.

(21) Appl. No.: 16/551,582

(22) Filed: Aug. 26, 2019

Related U.S. Application Data (60) Provisional application No. 62/870,659, filed on Jul. 3, 2019.

(51) Int. Cl.
*B65G 15/42* (2006.01)
(52) U.S. Cl.
CPC .................................... *B65G 15/42* (2013.01)
(58) Field of Classification Search
CPC ....................................................... B65G 15/42
USPC ......................................................... 198/699
See application file for complete search history.

(56) References Cited

U.S. PATENT DOCUMENTS

| | | | | |
|---|---|---|---|---|
| 3,077,062 A | * | 2/1963 | Brumbaugh | B65B 7/20 53/467 |
| 4,366,898 A | * | 1/1983 | Bobrysheva | A01D 89/003 16/380 |
| 4,911,286 A | * | 3/1990 | Herzke | B65G 15/44 198/690.2 |
| 9,260,247 B2 | * | 2/2016 | Miller | B65G 15/58 |
| 9,783,368 B2 | * | 10/2017 | DeGraw | B65G 21/20 |

* cited by examiner

*Primary Examiner* — Gene O Crawford
*Assistant Examiner* — Lester Ill Rushin
(74) *Attorney, Agent, or Firm* — Lamon Patent Services; Cynthia S. Lamon (57) ABSTRACT

A position-adjustable material conveyer cleat includes apparatus for adjusting cleat position. The cleat includes a mountable base portion rotably joined to a top portion via a pin axle. The pin axle including a torsion spring installed there over with a first tang connected to the base portion, and a second tang connected to the top portion, the connection made under spring tension against the top portion urging it downward into a prone position wherein adjustment is from the prone position to a vertical position. The top portion including a retention pin housing hosting a retention pin, the position adjustment apparatus in the form of mounted pin ramps for adjusting a pair of the cleats mounted to the conveyor belt via forced contact with the retention pins.

14 Claims, 7 Drawing Sheets

POSITION-ADJUSTABLE MATERIAL CONVEYER CLEAT

CROSS-REFERENCE TO RELATED DOCUMENTS

This US patent application claims priority to provisional patent application U.S. Ser. No. 62/870,659, file on Jul. 3, 2019.

BACKGROUND OF THE INVENTION

1. Field of the Invention

The present invention is in the field of construction equipment and pertains particularly to methods and apparatus for conveying materials onto and from a rooftop.

2. Discussion of the State of the Art

In the field of construction equipment, more particularly in the roofing industry, roofing materials have traditionally been carried or lifted onto a rooftop manually by the workers without any mechanical assistance. More recently, conveyor type systems including those that are hydraulically powered have been developed and used to convey heavy roofing materials such as roofing shingles for example from a ground location to the rooftop location where those materials will be applied in construction.

One such system is known to the inventor and is included herein at least by reference to U.S. Pat. No. 5,984,077 granted for a mobile overhead conveyor system. This system as known to the inventor may be referred to herein as Frye et al. The system of Frye et al is installed on a delivery truck that may deliver materials to a rooftop construction site. The system consists of a hydraulic rotary turret type base that supports, via a hydraulic lift mechanism or mechanisms, a boom structure housing a conveyor that can be operated under hydraulic power and positioned at an azimuth sufficient to convey roofing materials from the truck directly to a rooftop or from the rooftop back to the truck.

This system includes a feature that aids in the safety of operators and workers where electrical hazards exist such as nearby power lines or close electrical storm in that the main structural components of the boom, more particularly the side rails of the boom structure are fabricated from a non-conductive material such as fiberglass reinforced plastic beams. Also in this system, the conveyor belt is fabricated of a resilient and nonconductive polypropylene material.

One component that is directly critical to moving materials up a conveyor are the material stops also referred to hereinafter in the specification material cleats. In a system known to the inventor and referenced herein, material cleats are fixed in an upright position to the conveyor belt in a same direction. In this system, the cleats catch onto a material load staged for transport such as a bundle of roofing shingles, for example. The cleats are provided in pairs, spaced apart and facing toward the load which is loaded onto the conveyor from a material rest manifest at each side of the conveyer.

There are drawbacks to this system relative to height limitations for the cleats. The cleats are fixed single parts with no inflection or moving parts so they reside in a vertical position against the conveyer belt throughout the journey around the conveyer belt. Therefore, the cleats must be held below a maximum height dimension of about three inches as measured from the belt surface to the top edge of the cleat. The limitation is required due to the fact that there is only enough clearance on the return side of the conveyer that runs through the housing and frame elements for a cleat no more than 3 inches in height.

The short cleats are high enough to catch and move a load that is vertically still within the height limit. For example, if a single bundle of shingles is the same height as the cleat, then a second bundle on top of that may roll or slip backward as the materials are typically shuttled to a destination point higher in elevation from the beginning point like a roof top for example.

Therefore, what is clearly needed is a taller cleat apparatus that is position-adjustable and may be directed by mounted track hardware to assume a vertical position on the ferry side of the conveyer belt and to retain a prone position while passing through the underside of the conveyer belt. A system like this may enable larger vertical loads to be ferried from a first point to a second destination point without increasing the radius and general size of the conveyer system.

BRIEF SUMMARY OF THE INVENTION

A position-adjustable material conveyer cleat and apparatus for adjusting cleat position is provided comprising a base portion mountable to a conveyer belt using nuts and fang bolts, the base portion including at least one lateral through opening for accepting a pin axle, a top portion having at least one lateral through opening for accepting the pin axle, the top portion including a material interfacing surface and a retention pin housing hosting a retention pin against a compression spring, the retention pin housing substantially parallel to the pin axle such that an intersecting plane of the center lines of the pin axle and retention pin housing is substantially orthogonal to the plane of the material interfacing surface, a torsion spring installed over the pin axle, the torsion spring having a first tang connected to the base portion, and a second tang connected to the top portion the connection made under spring tension against the top portion, the spring tension urging the top portion to rotate about the pin axle and into a prone position wherein the material interfacing surface of the top portion abuts flush to the top surface of the conveyer belt and wherein the retention pin housing is elevated vertically, and a position adjustment apparatus in the form of mounted pin ramps for adjusting a pair of the cleats mounted to the conveyor belt from the prone position to a vertical position.

In one embodiment, the position adjustment apparatus comprise a left and a right pin contact ramp disposed proximal to the tail pulley end of a conveyor one at each side of the pulley, the ramps strategically mounted to provide pin contact against curved bottom edges of the ramps as a means to drive the retention pins downward along the curves causing the top portions of a pair of the cleats to rotate about the axle pins to vertical position against tension in the torsion springs. In one embodiment, the base portion and top portion of the material conveyor cleat is manufactured of a nylon material or other non-conductive or electrically resistive material.

In one embodiment, the material interface has a worked or molded surface in the form of a tread pattern. In one embodiment, the pin ramps include pin depression tabs that depress the retention pins into the retention pin housings while the conveyer belt is run in reverse to retain a prone position for the pair cleats. In a preferred embodiment of the invention, a pair of cleats are flipped up to vertical position in the tail pulley section of the conveyer just before contacting a vertically-stacked material load resting on a material loading platform.

In one embodiment, the pin retention tabs are presented at a same elevation as the sprung retention pin while the cleat is in a prone position on the conveyer belt. In this embodiment, the pin retention tabs are at the top of the pin ramps and angle out to a position that enable the retention pins to make contact and become depressed, staying depressed against the compression springs while along the inside walls of the pin ramps. In one embodiment, the pin ramps are bracketed to a conveyer belt slack adjuster loaded on the tail pulley.

According to one aspect of the invention, a method is provided for conveying materials from a first point to a second point along a conveyer using a material conveyor having a conveyer belt and position-adjustable material cleats and position adjustment apparatus mounted to the conveyer, the cleats having a top portion and a base portion mounted to a pin axle under spring tension to keep the material cleats in a prone position against the conveyer belt, the method including step (a) place material on material load platform at the first point, (b) start conveyer in forward direction, (c) catch retention pins of next set of cleats traveling through the tail pulley section using pin ramps at the first point, (d) urge retention pins downward along the bottom curved edges of the pin ramps and thereby adjusting to vertical while within the tail pulley section, (e) catching material loaded on the material load platform just out of the tail pulley section, and remaining vertical against spring tension because of material load weight overriding the spring tension, and (f) removing the material load at the second point causing the cleats to flip down in a prone position traveling on the return side of the conveyer belt.

In one aspect of the method, in step (a), the material load platform is manifest on either side of the conveyer belt allowing upright material cleats to pass through and take material. In one aspect of the method, the first point is a material truck bed and the second point is a rooftop. In a preferred aspect, in step (c), the pin ramps are located along the tail pulley section, the bottom edges thereof curved downward toward the conveyer belt at the forward end of the tail pulley section. In all aspects of the method, in step (d), the adjustment to position is from a prone position to a vertical position, the process unfolding while the cleats are in contact with the pin ramps in the tail pulley section.

DETAILED DESCRIPTION OF THE INVENTION

The inventor provides a position-adjustable material cleat apparatus and hardware to effect position switching relative to holding a vertical or probe position against the conveyer belt surface. A goal of the present invention is to have a means for loading a larger vertical load from a first point to a second point along the conveyer length without scaling up the size of the conveyer system uniformly. The present invention is described in enabling detail using the following examples, which may describe more than one relevant embodiment falling within the scope of the present invention.

Figure 1:
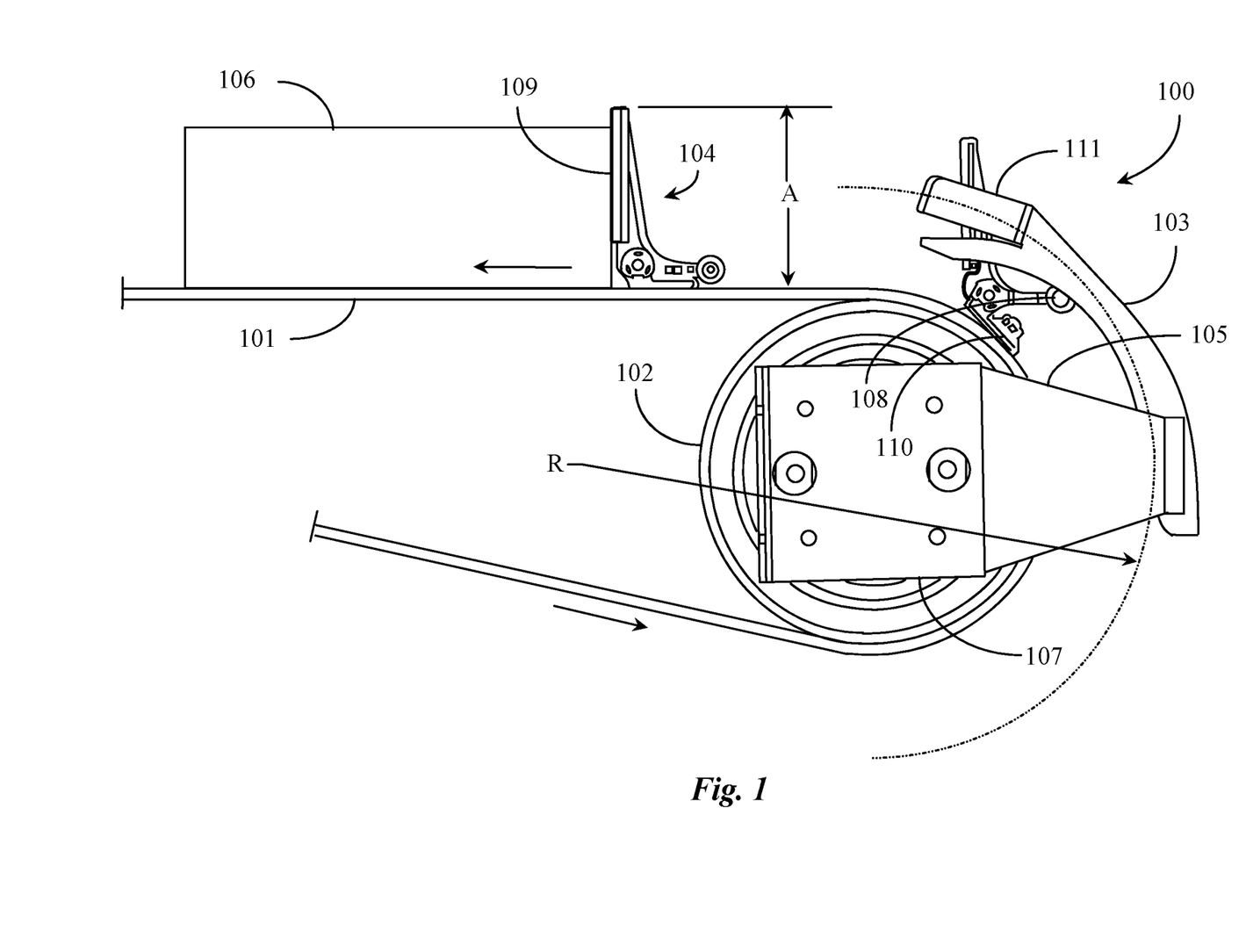
FIG. 1 is a partial side-elevation view of a material conveyor 100 with position-adjustable material cleats according to an embodiment of the invention.

FIG. 1 is a partial side-elevation view of a material conveyor 100 with position-adjustable material cleats according to an embodiment of the invention. Material conveyer 100 is depicted in this partial view in the portion of the tail pulley end of conveyer 100. Tail pulley 102 supports a conveyer belt 101. In this view, the forward direction of belt 101 is indicated by directional arrows and is counter clockwise in this view of the left side of the conveyer from the perspective of the viewer.

Material cleats 104 are provided in spaced apart pairs wherein each pair is also spaced apart from adjacent pairs along the length of conveyer belt 101. Material cleat 104 is a position adjustable cleat with respect to its vertical profile when carrying material to a prone position wherein the cleat lies face down against conveyer belt 101. Cleats 104 are installed to conveyer belt 101 using bolt and nut hardware. Cleat 104 includes a top material interface plate 109 and a bottom base component 110. The top portion of cleat 109 includes a pin housing that accepts a spring-loaded steel pin 108. Top portion 109 of cleat 104 is designed to be rotable about an axle adapted to connect the top portion 109 and base portion 110 such that top portion 109 may be urged into a vertical profile position on the material ferry side of conveyer 100 or be allowed to retain a prone position against belt 101 on the belt-return side of the conveyer with the material interfacing surface of top portion 109 lying face down against the belt.

Position adjustable material cleat 104 is spring tensioned to remain in a prone position against belt 101 as described above. A torsion spring assembly is provided connecting the base portion 110 to a pin axle supporting the top material interface portion 109 of cleat 104. A material load 106 is depicted flush against material cleat 104 in a vertical position thus preventing cleat 104 from assuming a prone position. Cleat 104 is urged into a vertical or up right position to move materials via a flip ramp apparatus 103 that functions to lift cleat 104 at the start of the material catch zone on the carry side of belt 101. The base section 110 is made largely non-conductive materials such as nylon. The top portion section of cleat 105 has an axial connection to the base section with a pin and cotter. The middle section, which includes top portion 109 is made largely of non-conductive materials such as nylon. Metallic components may include pins springs and installation bolts and nuts. Metallic components may be selected from metals having higher resistance characteristics to conduction of electricity.

Cleat 104 has an overall vertical height dimension A when in vertical profile and carrying material. Dimension A may be about four and three sixteenth inches in height. Dimension A is enabled only on the carry side of conveyer belt 101. When material load 106 is removed from belt 101 such as on a rooftop, material cleat 104 springs immediately downward and assumes a prone position with the material interfacing surface 109 flush against the belt. Height profile A is taller than the height profiles of fixed material cleats previously known to the inventor. The ability to adjust the profile position (vertical vs prone) of cleat 104 enables more material to be vertically loaded on the conveyer at a cleat position. In prone position, a pin housing encasing a spring loaded pin 108 assumes a vertical position on conveyer belt 101 at a height of only about two inches. Therefore, cleat 104 must remain in prone position on the return side of conveyer belt 101 to avoid contact with framing elements and other hardware components or elements.

In one embodiment of the present invention, a flip ramp bar 103 is provided and is mounted via a bracket 105 to a belt slack take in plate 107 at pulley component 102. Material cleat 104 is urge from a prone position coming into the tail pulley section from the return side of conveyer belt 101 into a vertical position for ferrying materials by contact made against pin 108 at the lower curved edge of flip ramp 103 while belt 101 is driven forward. Material cleat is flipped up completely before emerging from flip ramp 103 and just before making contact with material load 106. The material load is pushed off of a material loading ramp (not illustrated) strategically located at the top side of the conveyer.

Material 106 is manually placed on the ramp by an operator after the last load is in transit and before a next set of position-adjustable materials stops 104 emerge from the flip ramp 103. The process of flipping up the cleat into a vertical position occurs against spring tension to hold the part in prone position. Pin 108 presents vertically when material cleat is in prone position. As the cleat in prone position enters the tail pulley section, pin 108 eventually contacts the bottom edge of flip ramp 103 at the elevation from the belt of radius R. As the belt proceeds, the bottom edge of the flip ramp curves downward closer to the belt drawing the pin down against spring tension lifting cleat 104 from prone to vertical position. The staged material load is placed close enough to the flip ramp 103 that when the pin is no longer in contact with the bottom curved edge of the flip ramp and the cleat attempt to spring back into prone position, the material load 106 is in the way and obfuscates spring back allowing the cleats to remain vertical while conveying materials. When an operator removes a conveyed material load at the other end of the conveyer (material destination) cleats 104 immediately spring back down into a prone position for low profile return on the return side of conveyer 100. The cleats are flipped up again when they next travel around the tail pulley making contact with the mounted flip ramp 103.

Flip ramp 103 includes a prone position entry Tab 111 in an event that an operator changes the direction of belt 101 to reverse direction. In reverse direction, position adjustable cleats 104 remain in prone position wherein pin 108 makes contact with entry tab 111 and is depressed against spring tension until the cleats pass through the flip ramp in prone position where the pin 108 remains in prone-elevated position along radius R indicating no movement of cleat 104 from a prone position against the belt.

Figure 2:
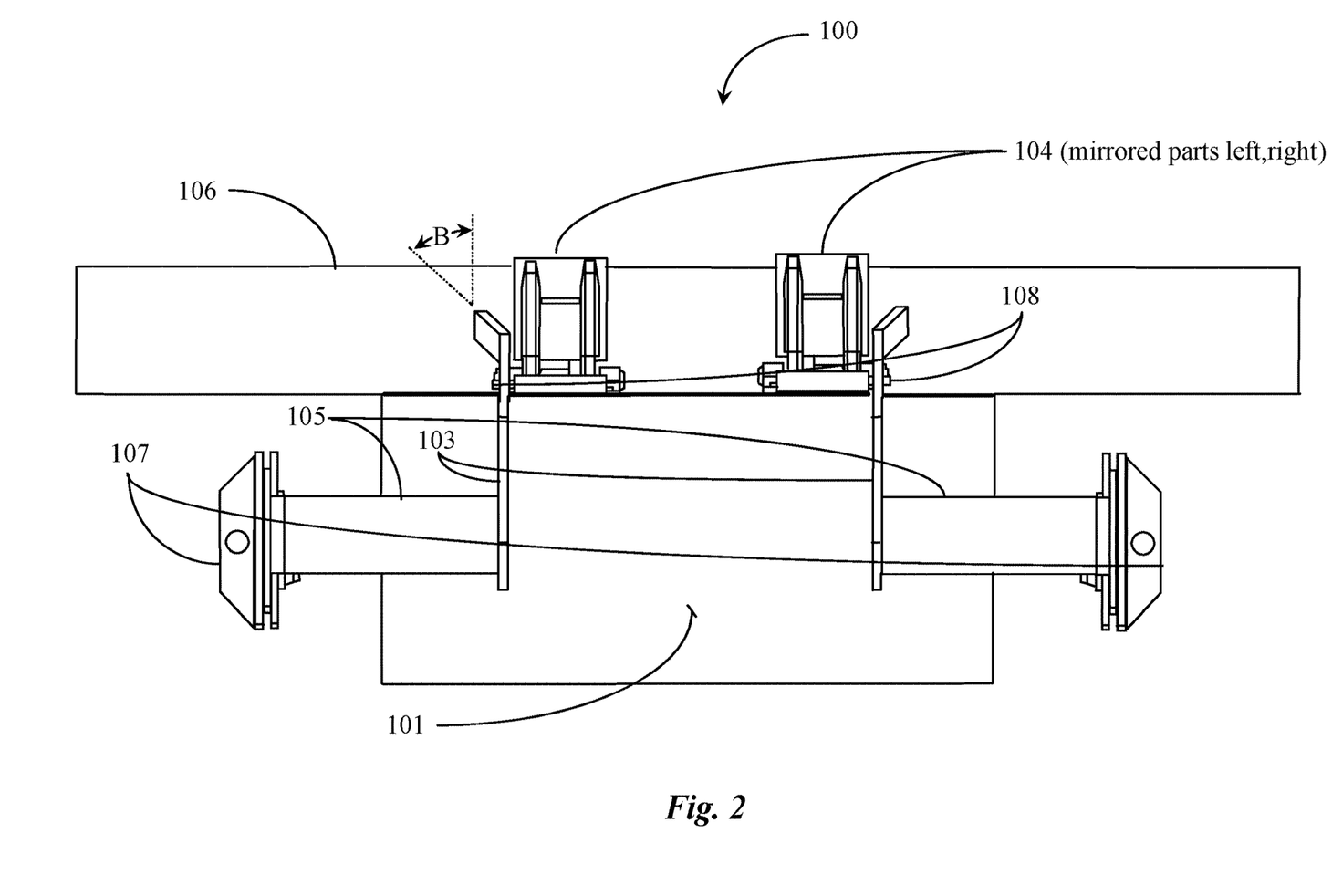
FIG. 2 is a rear-end view of the conveyer of FIG. 1.

FIG. 2 is a rear-end view of conveyer 100 of FIG. 1. In this simple end view, position adjustable cleats 104 are visible in spaced apart arrangement, flipped up to ferry material load 106. Pins 108 are at the end of flip ramps 103, brought to vertical position by the curvature of the bottom edge of the flip ramps. Belt slack adjustors 107 change position with pulley components when, for example, the belt stretches and the slack must be taken up. With periodic slack adjustments in belt tension are made at the pulley end, the flip ramp bars 103 are always presented at the critical position and correct orientation to flip or urge up the material cleats into vertical position to convey materials alone the conveyer.

In this view entry tabs 111 are angled represented herein by angles B in the appropriate directions on each side of conveyer 100 to catch and depress pins 108 on cleats 104. Flip ramp components may be manufactured of durable materials that are resistive to conducting electric current like a durable nylon material. The use of non-conductive materials for manufacturing a position adjustable cleat and the position flip ramp utility is not required in order to practice the invention but is recommended to keep the conveyer system from conducting electricity during inadvertent lighting strikes or accidental contact with utility wires, etc.

Flip ramps 103 are aligned and spaced in order to enable pin contact along the bottom curves of the ramps where that contact urges cleats 104 to vertical position and to enable entry of cleats 104 in prone position in reverse direction where the pins 108 are alternatively depressed by entry tabs 111 and then held depressed along the inside walls of the flip ramps until leaving the flip ramps.

Figure 3A:
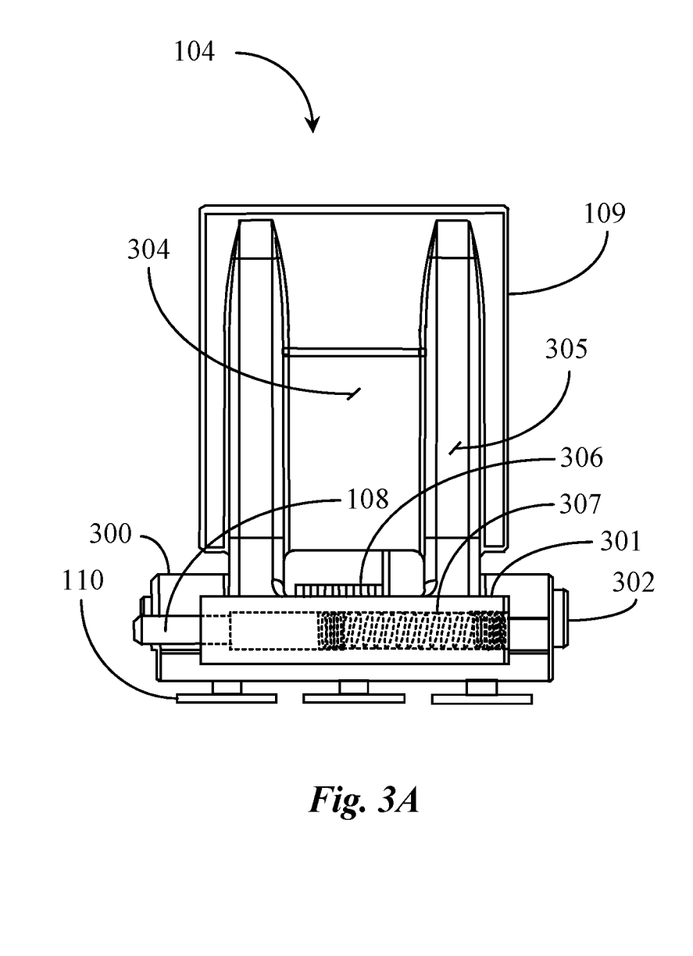
FIG. 3A is a rear elevation view of one of the position-adjustable cleats of conveyer 100 of FIG. 1.

FIG. 3A is a rear elevation view of position-adjustable cleat 104 of conveyer 100 of FIG. 1. Material cleat 104 is an assembly containing multiple components that are designed and integrated to provide the added utility of cleat flipping as a means to enable a much taller vertical profile of the cleat for moving more material saving time and improving efficiency in material loading operations such as from a material laden truck to a roof top. Position-adjustable cleat 104 includes a portion 109 of the cleat that interfaces with material. The top portion of cleat 104 includes a pin housing 301 that retains pin 108 therein. Pin 108 emerges from housing 301 under a spring tension from a compression spring 307. Therefore, pin 108 is always in a state of extension unless depressed by the flip ramp entry tab 111 and held in that state by the inside wall of the flip ramp (see FIG. 1).

Cleat 104 has a back frame 305 that is contiguously a part of pin housing 301 such that in prone position, housing 301 and pin 108 are held vertical while top portion 109 rests against the conveyer belt due to torsion spring tension. Base portion 110 includes an axle housing 300 that retains a pin axle 302 that may be a steel pin. Housing 300 is contiguously part of base 110. Cleat 104 is mounted to the conveyer belt using lock nuts and fang bolts.

Frame 305 is an arcuate structure that supports material cleat back surface 304 and pin housing 301 such that when top portion 109 rotates about pin axle 302, pin housing 301 assumes a vertical position elevating pin 108 for contact with flip ramp 103 to flip cleat 104 vertical (belt in forward drive) or entry tab 111 on flip ramp 103 (belt in reverse drive). Torsion spring 306 is strategically mounted over pin axle 302 and connects to base portion 110 and top portion 109 with enough tension to drive top portion 109 down against the conveyer belt. In vertical position, the material load prevents cleat 104 from assuming the prone position against the conveyer belt.

Figure 3B:
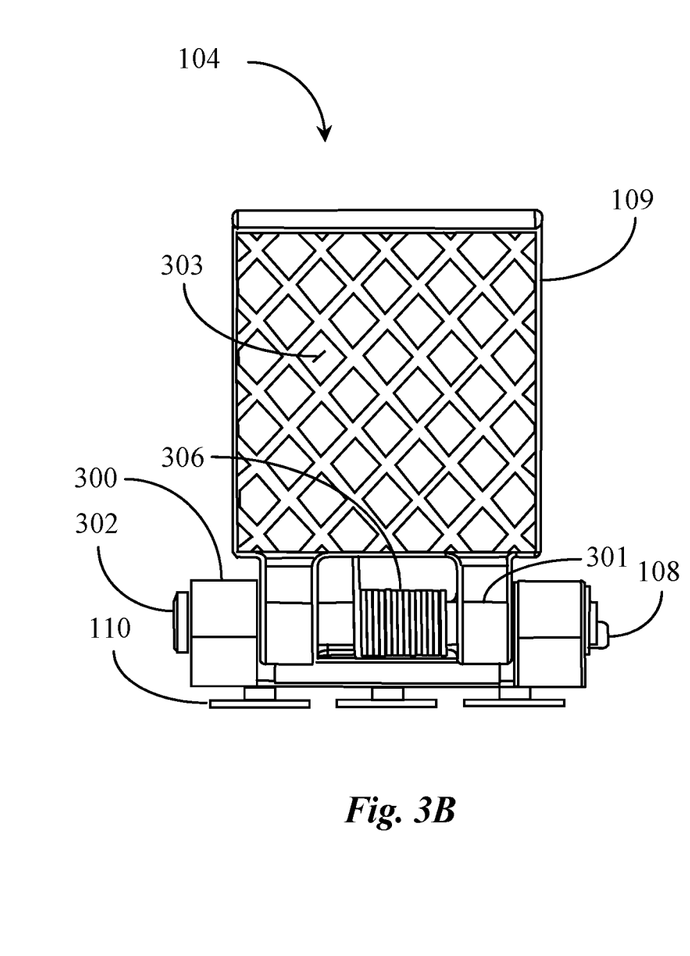
FIG. 3B is a front elevation view of the position adjustable cleat of FIG. 3A.

FIG. 3B is a front elevation view of position adjustable cleat 104 of FIG. 3A. Top portion 109 includes material interface wall 303. Wall 303 may be attached to back surface plate 304 of FIG. 3A. Material interfacing wall 303 may be fabricated of nylon and may be worked in the form of a tread pattern that improves surface grip against a load such as against a bundle of shingles for example. In this front elevation view, torsion spring 306 wraps around the axle pin 302 which may be a cotter pin in one embodiment. In one embodiment cleat 104 is manufactured entirely of non-electrically conductive materials. In one embodiment top portion 109 and base portion 110 are assembled using the cotter pin 302 and a pin retainer or cotter enabling the limited motion required (90 degrees) to flip up cleat 104 from prone position retained by torsion spring 306 to vertical position retained by material load abutment.

Figure 4A:
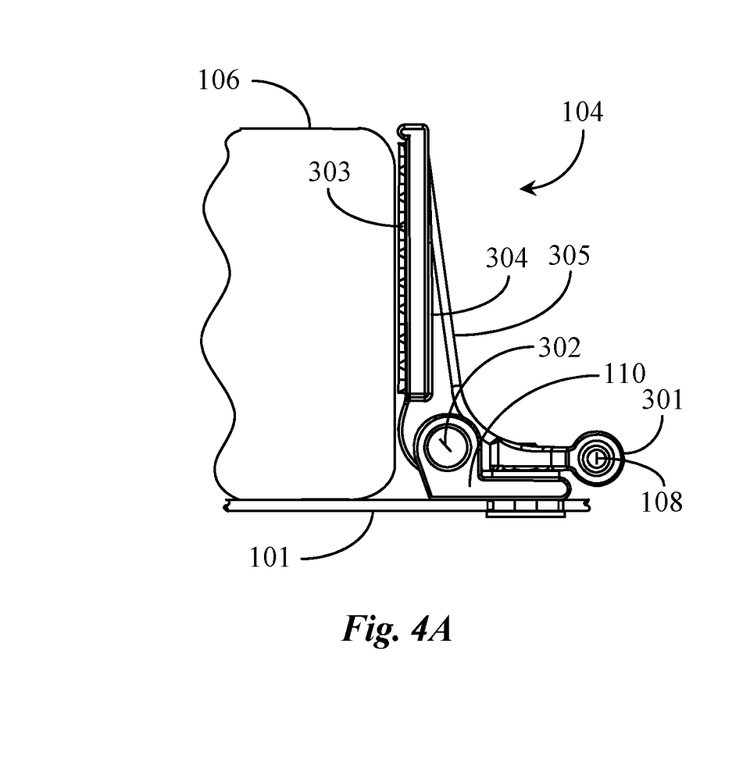
FIG. 4A is a side elevation view of one of the position-adjustable cleats of conveyer 100 of FIG. 1 positioned upright to ferry a load.

FIG. 4A is a side elevation view of one of position-adjustable cleat 104 of conveyer 100 of FIG. 1 positioned upright to ferry a load. Cleat 104 is retained in a vertical position against torsion spring tension by material load 106. Material interfacing surface 303 remains flush against load 106 until an operator removes load 106 enabling the torsion spring to rotate the top portion down around axle 302 until surface 303 rests against conveyer belt 101.

Figure 4B:
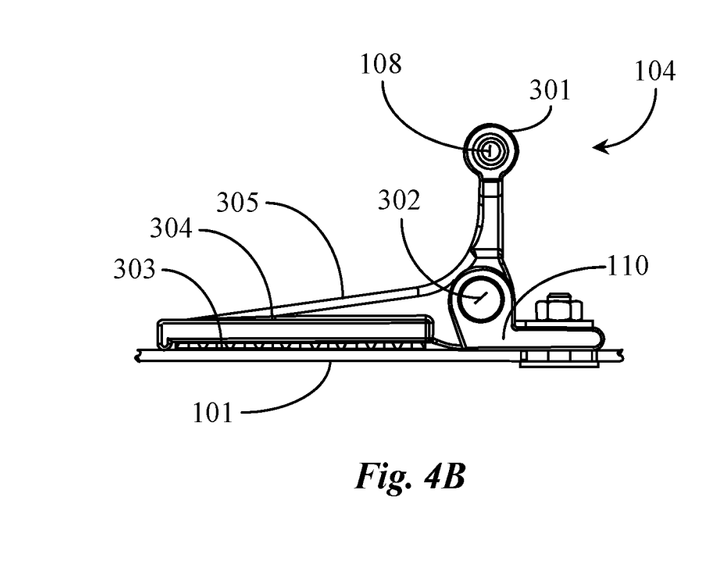
FIG. 4B is a side-elevation view of the position-adjustable cleat of FIG. 4A resting face down under spring tension according to an embodiment of the invention.

FIG. 4B is a side-elevation view of position-adjustable cleat 104 of FIG. 4A resting face down under spring tension according to an embodiment of the invention. Cleat 104 is in prone position in this view. In prone position, pin 108 is elevated to vertical position for possible contact with the entry tab 111 on the flip ramp 103 should the conveyer be reversed in belt direction. In that event, pin 108 is depressed into pin housing 301 against compression spring 307 (see FIGS. 1 and 3A) and stays depressed into the pin housing until cleat 104 moves past flip ramp 103. The flip ramp urges cleat 104 upward from the prone position in FIG. 4B into the vertical position in FIG. 4A just before the cleat makes contact with material load 106.

Figure 5:
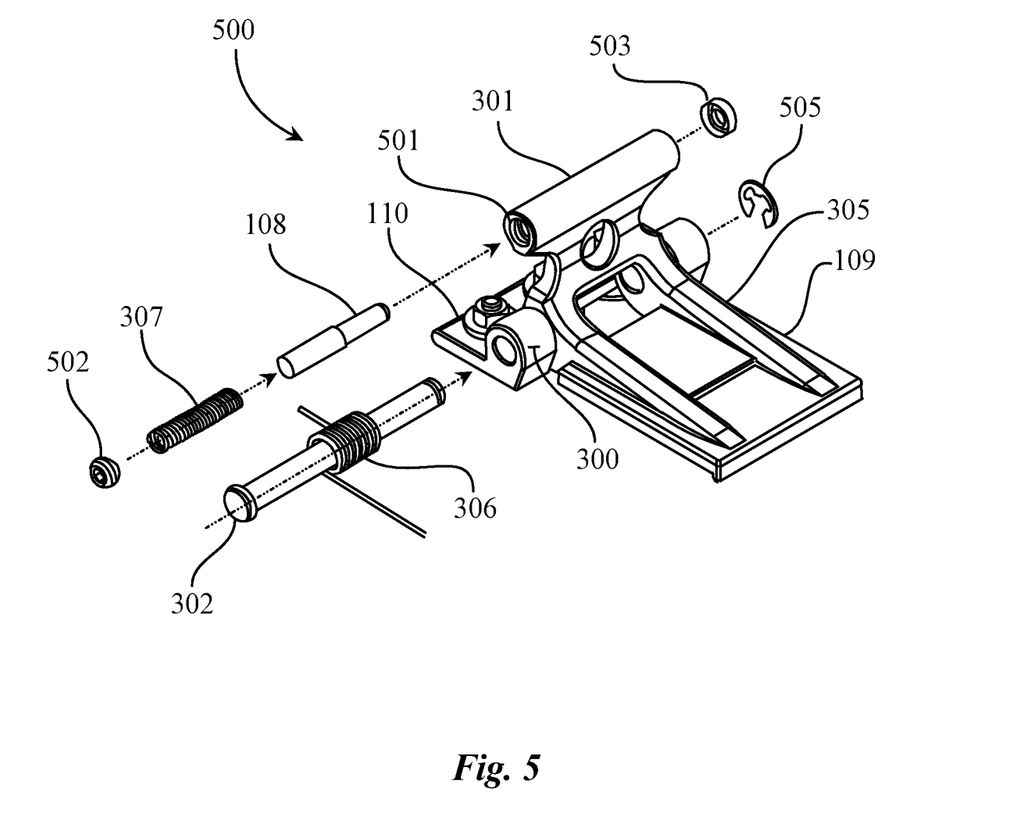
FIG. 5 is an exploded view of the mechanical hardware enabling position vertical adjustment with belt moving forward and prone position retention when belt direction is reversed.

FIG. 5 is an exploded view of a mechanical hardware assembly 500 enabling position adjustment to vertical with the conveyer belt moving forward and retention in prone position when belt direction is reversed. Assembly 500 includes top portion 109 and base portion 110 that are connected rotably together with a cotter pin axle 302. Torsion spring 306 is placed over axle pin 302 and has attachment to base portion 110 and to top portion 109. A cotter 505 is provided at the far end to retain axle pin 302 in position through the respective openings provided through base portion 110 and middle portion 109. The collective openings have an inside dimension just larger than the outside dimension of the cotter pin axle 302.

Back frame 305 provides the arcuate structure supporting the material interface plate of the cleat and the pin housing for the retention pin in an offset relationship about ninety degrees. Axle housing 300 is a contiguous part of base portion 110, which is bolted down using three Nylock nuts and fang bolts. Retention pin housing 301 is a contiguous part of top portion 109. A retainer cap 503 is provid3ed at one end to prevent retention pin 108, which has a shoulder, from existing out of the housing. In this assembly, retention pin 108 is loaded into the housing followed by compression spring 307.

Housing 301 is threaded internally at one end depicted herein as internal threading 501 to accept the male threads of a set screw 502 provided to seat pin 108 properly under spring tension into the housing. Pin 108 extends out of housing 301 in a natural state but may be depressed into the housing against compression spring 306. Base portion 110 and top portion 109 may be machined parts connected together by assembly 500 to form a position-adjustable material cleat such as cleat 104. When top portion 109 is vertical, pin housing 301 and protruding pin 108 is held down against base portion 110 of cleat 104.

When top portion 109 is prone against the conveyer belt, then pin 108 is in top vertical position and may then interact with the flip ramp. It may be noted herein that in pr5one position with the conveyer belt in reverse, materials may be conveyed from a roof top for example back down to a materials truck where the load rests against back frame 305 and retention pin housing 301 presenting vertical about 2 inches or so above the surface of the conveyer belt.

Figure 6:
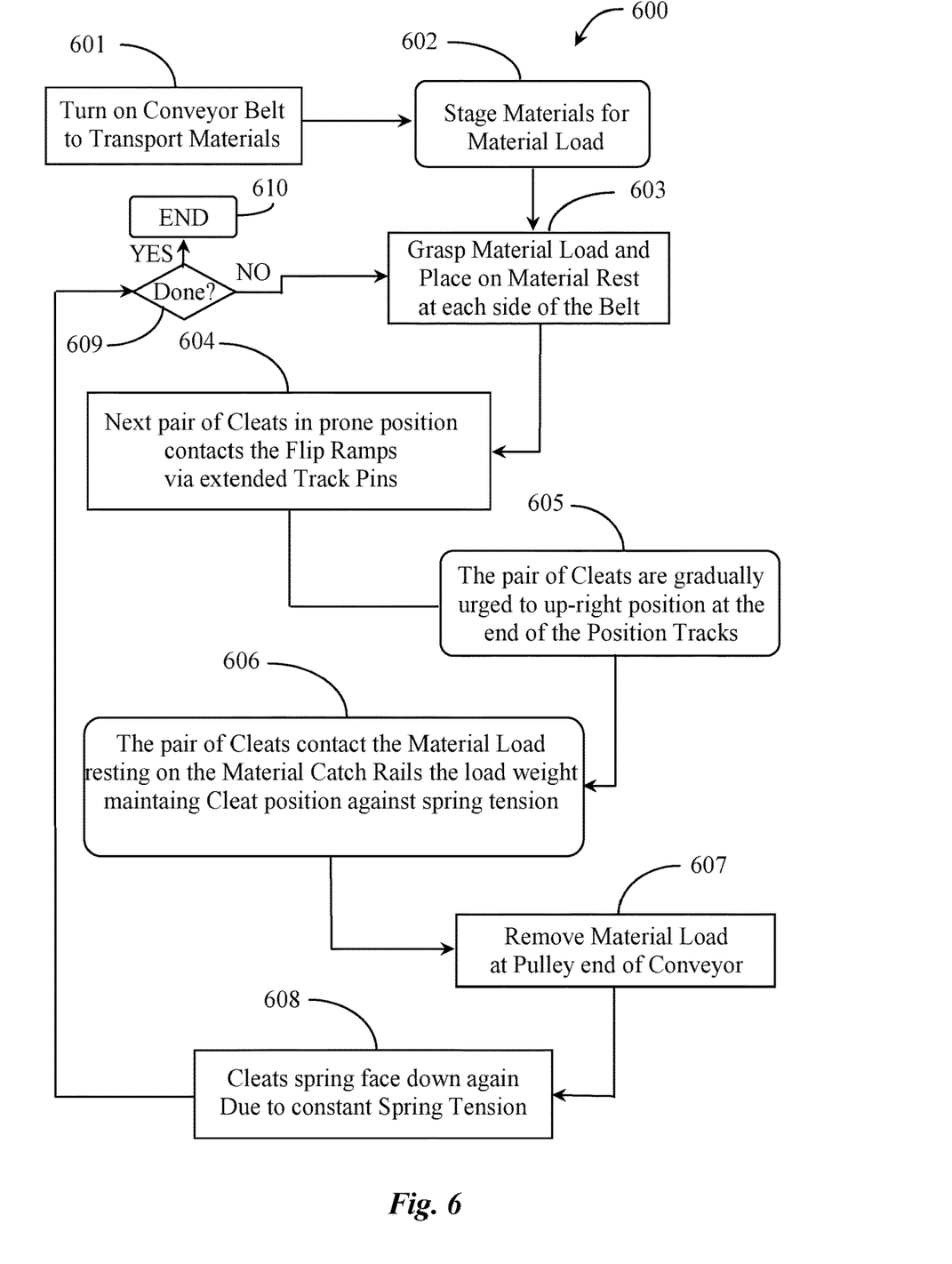
FIG. 6 is a process flow chart depicting steps for conveying materials from a first point to a second point material destination.

FIG. 6 is a process flow chart 600 depicting steps for conveying materials from a first point to a second point material destination. It is assumed that a conveyor has been positioned to convey materials such as from a materials truck to a roof top for example. At step 601, an operator in the material truck bed may power on the conveyer belt to transport or convey materials from a first point (materials truck) to a second point (roof top). At step 602, the operator may stage materials on a material loader or on a platform close to the conveyer so that timed material placement may be practiced.

At step 603, the operator may grasp a load of material and place the load on a material rest adapted to stage a load for capture and carry by a next pair of material cleats coming out of the flip ramps. The material bundle typically spans the width of the conveyer belt and can be placed on rails at the outer edges of the belt, the rails functioning collectively as a material rest or catch platform to hold the material above the belt until position adjusted cleats hit the bundle in vertical position. At step 604 a pair of material cleats reach and begin around the tail pulley and make contact with the flip ramps positioned for operation on each side of the pulley.

At step 605, the pair of cleats continues through the flip ramps and are urged into vertical position within the domain of the ramps. At step 606, the pair of cleats contact the material is urged off the material rest by the forward motion of the cleats and onto the conveyer belt and further along the belt in forward mode relative to belt direction. The presence of a load against the front grip walls of the cleats prevent the cleats from assuming the prone position.

At step 607, another operator at the material destination end of the conveyer may remove a load that was transported up the conveyer by picking it up off of the conveyer belt. At step 608, the material cleats spring down into prone position as soon as the material load is lifted off the belt at the material destination end of the conveyer. It may be noted that material may be taken off the conveyer at any point along the length of the conveyer and the cleats will immediately assume the prone position.

At step 609, a determination may be reached by the operators as to whether the operators are done receiving materials. If the consensus is that they are not finished conveying material, the process may resume at step 603. If at step 609, the operators determine they are finished, the process may end at step 610. In one embodiment, after conveying materials to a roof top or other destination, materials may also be carried back down the conveyer with the belt switched to reverse direction. In reverse direction the cleats remain in the prone position. Materials may be placed against the retention pin housings when the cleats are in prone position to carry them down.

Figure 7:
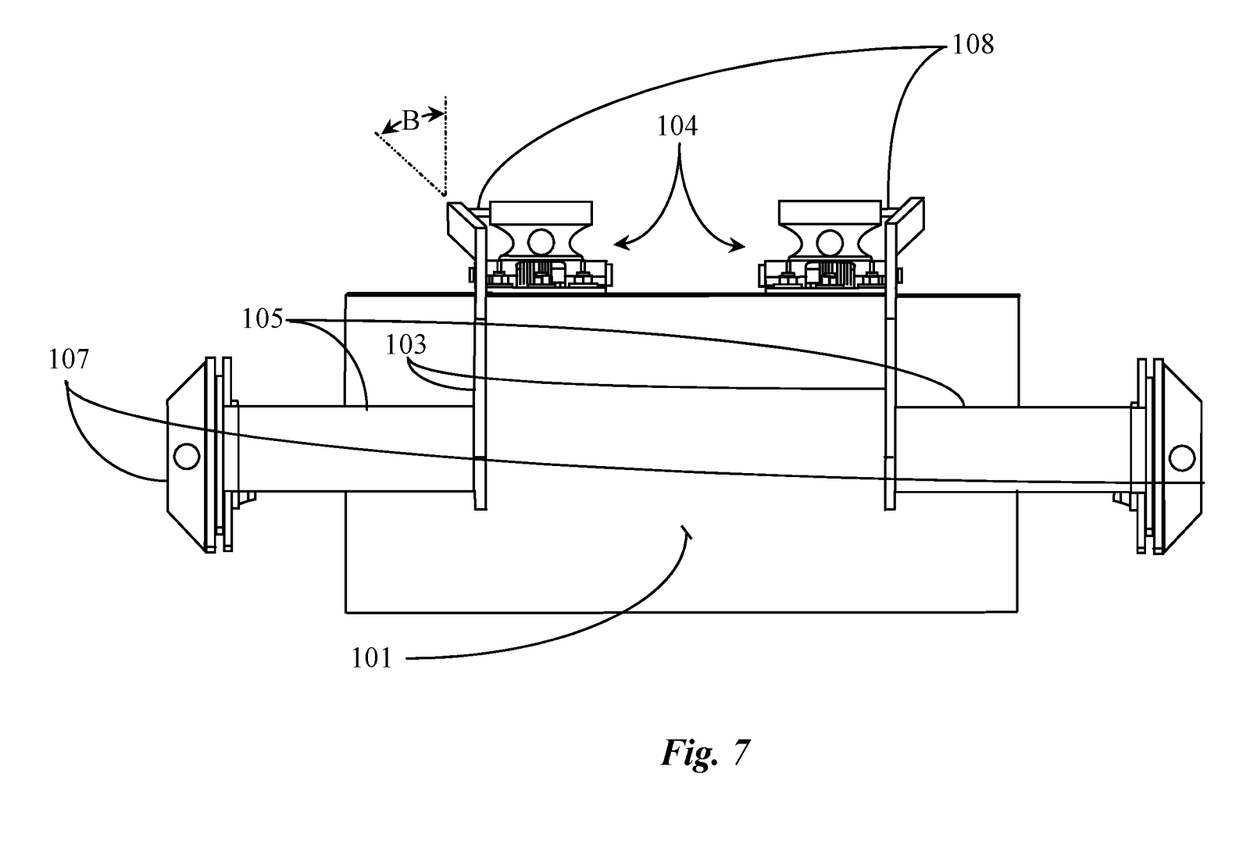
FIG. 7 is a rear-end elevation view of conveyor 100 with the position-adjustable conveyer cleats in a face down position with the belt driven in reverse according to an embodiment of the invention.

FIG. 7 is a rear-end elevation view of conveyor 100 with the position-adjustable conveyer cleats in a face down prone position with the belt driven in reverse according to an embodiment of the invention. This view is the same perspective as the view in FIG. 2 above. The only difference between views is that the cleats 104 are in the prone position in this embodiment presenting retention pins 108 in line for depression by entry tabs 111 using angle B to capture and depress the pins so they do not contact the lower edge of the flip ramp. No materials need be present in this embodiment while the belt is being operated in reverse, but materials may be conveyed down the conveyer with the cleats remaining in prone position without departing from the spirit and scope of the invention.

It will be apparent to one with skill in the art that the position-adjustable material cleat of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention. The invention is limited only by the breadth of the claims below.

The invention claimed is:

1. A position-adjustable material conveyer cleat and apparatus for adjusting cleat position comprising:
    a base portion mountable to a conveyer belt using nuts and fang bolts, the base portion including at least one lateral through opening for accepting a pin axle;
    a top portion
having at least one lateral through opening for accepting the pin axle, the top portion including a material interfacing surface and a retention pin housing hosting a retention pin against a compression spring, the retention pin housing substantially parallel to the pin axle such that an intersecting plane of the center lines of the pin axle and retention pin housing is substantially orthogonal to the plane of the material interfacing surface;
    a torsion spring installed over the pin axle, the torsion spring having a first tang connected to the base portion, and a second tang connected to the top portion the connection made under spring tension against the top portion, the spring tension urging the top portion to rotate about the pin axle and into a prone position wherein the material interfacing surface of the top portion abuts flush to the top surface of the conveyer belt and wherein the retention pin housing is elevated vertically; and
    a position adjustment apparatus in the form of mounted pin ramps for adjusting a pair of the cleats mounted to the conveyer belt from the prone position to a vertical position.

2. The material cleat and position adjustment apparatus of claim 1, wherein the position adjustment apparatus comprise a left and a right pin contact ramp disposed proximal to the tail pulley end of a conveyer one at each side of the pulley, the ramps strategically mounted to provide pin contact against curved bottom edges of the ramps as a means to drive the retention pins downward along the curves causing the top portions of a pair of the cleats to rotate about the axle pins to vertical position against tension in the torsion springs.

3. The material cleat and position adjustment apparatus of claim 2, wherein the base portion and top portion of the material conveyer cleat is manufactured of a nylon material or other non-conductive or electrically resistive material.

4. The material cleat and position adjustment apparatus of claim 2, wherein the material interface has a worked or molded surface in the form of a tread pattern.

5. The material cleat and position adjustment apparatus of claim 2, wherein the pin ramps include pin depression tabs that depress the retention pins into the retention pin housings while the conveyor belt is run in reverse to retain a prone position for the pair cleats.

6. The material cleat and position adjustment apparatus of claim 2, wherein a pair of cleats are flipped up to vertical position in the tail pulley section of the conveyer just before contacting a vertically-stacked material load resting on a material loading platform.

7. The material cleat and position adjustment apparatus of claim 5, wherein the pin retention tabs are presented at a same elevation as the sprung retention pin while the cleat is in a prone position on the conveyer belt.

8. The material cleat and position adjustment apparatus of claim 7, wherein the pin retention tabs are at the top of the pin ramps and angle out to a position that enable the retention pins to make contact and become depressed, staying depressed against the compression springs while along the inside walls of the pin ramps.

9. The material cleat and position adjustment apparatus of claim 2, wherein the pin ramps are bracketed to a conveyer belt slack adjuster loaded on the tail pulley.

10. A method for conveying materials from a first point to a second point along a conveyer using a material conveyor having a conveyer belt and position-adjustable material cleats and position adjustment apparatus mounted to the conveyer, the cleats having a top portion and a base portion mounted to a pin axle under spring tension to keep the material cleats in a prone position against the conveyer belt, including the steps:
    (a) place material on material load platform at the first point;
    (b) start conveyer in forward direction;
    (c) catch retention pins of next set of cleats traveling through the tail pulley section using pin ramps at the first point;
    (d) urge retention pins downward along the bottom curved edges of the pin ramps and thereby adjusting to vertical while within the tail pulley section; and
    (e) catching material loaded on the material load platform just out of the tail pulley section, and remaining vertical against spring tension because of material load weight overriding the spring tension; and
    (f) removing the material load at the second point causing the cleats to flip down in a prone position traveling on the return side of the conveyer belt.

11. The method of claim 10, wherein in step (a), the material load platform is manifest on either side of the conveyer belt allowing upright material cleats to pass through and take material.

12. The method of claim 10, wherein in the first point is a material truck bed and the second point is a rooftop.

13. The method of claim 10, wherein in step (c), the pin ramps are located along the tail pulley section, the bottom edges thereof curved downward toward the conveyer belt at the forward end of the tail pulley section.

14. The method of claim 10, wherein in step (d), the adjustment to position is from a prone position to a vertical position, the process unfolding while the cleats are in contact with the pin ramps.

\* \* \* \* \*